Oct. 30, 1923.
F. H. GRIFFITHS ET AL
LIQUID PUMPING APPARATUS
Filed July 11, 1921
1,472,560
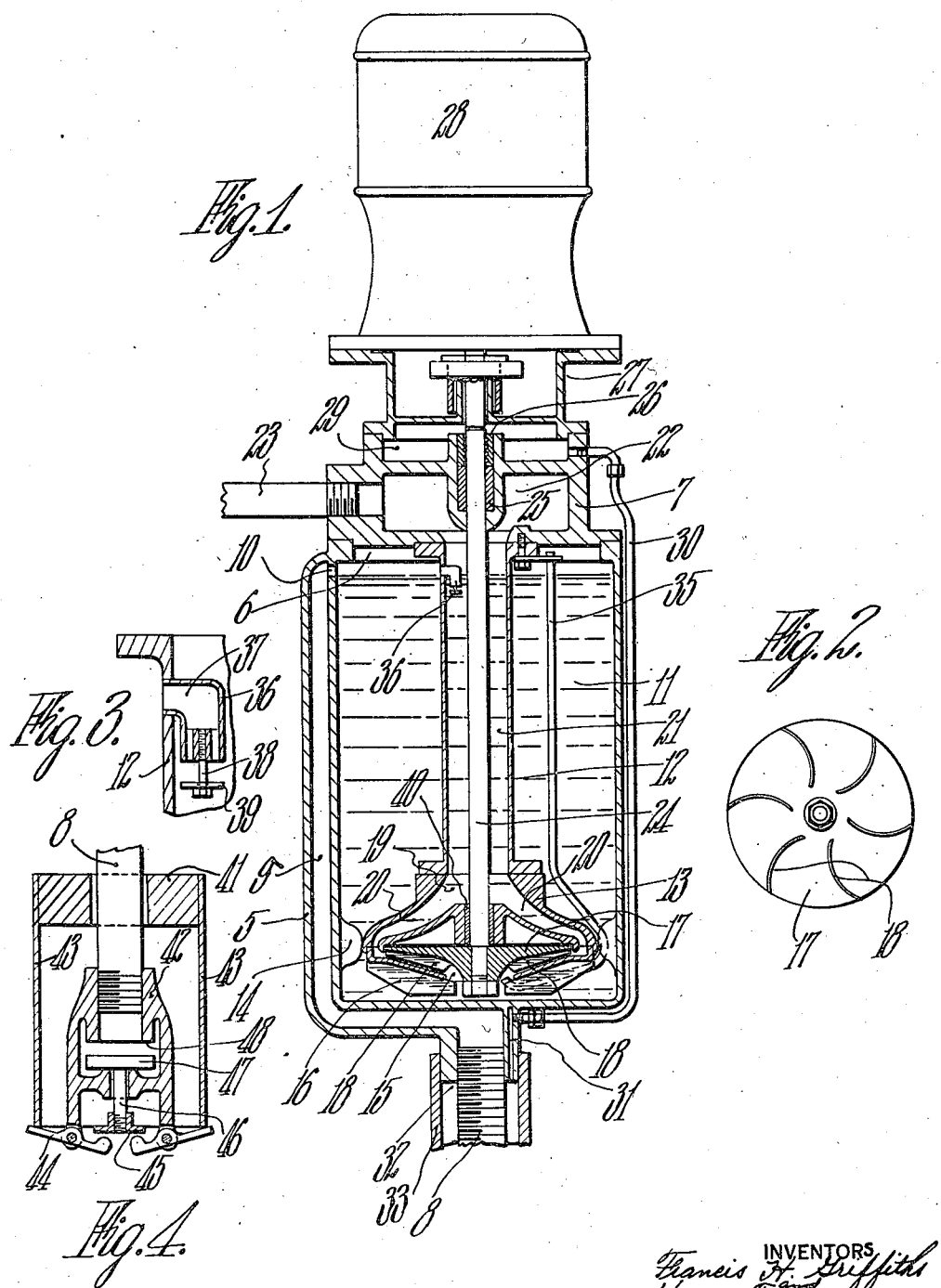
INVENTORS
Francis H. Griffiths
Harry F. Benson
BY
Chapin & Neal
ATTORNEYS

Patented Oct. 30, 1923.

1,472,560

UNITED STATES PATENT OFFICE.

FRANCIS H. GRIFFITHS, OF SPRINGFIELD, AND HARRY F. BENSON, OF HOLYOKE, MASSACHUSETTS.

LIQUID-PUMPING APPARATUS.

Application filed July 11, 1921. Serial No. 483,776.

*To all whom it may concern:*

Be it known that we, FRANCIS H. GRIFFITHS and HARRY F. BENSON, citizens of the United States, residing at Springfield, in the county of Hampden and State of Massachusetts, and Holyoke, county of Hampden, and State of Massachusetts, respectively, have invented new and useful Improvements in Liquid-Pumping Apparatus, of which the following is a specification.

This invention relates to pumping apparatus for liquids and is more particularly concerned with apparatus which utilizes a pump of the impeller type, such, for example as a centrifugal pump.

The invention has for an object to provide a pumping apparatus including a pump of the impeller type, which is effective to lift liquids from levels at substantial distances below the pump without requiring priming of the pump at each operation thereof.

Another object of the invention is to provide, in apparatus of this type, means for preventing removal of the priming liquid on cessation of pumping, due to surging action of the liquid in the lift pipe which might otherwise tend to draw the liquid back below the level of the pump inlet.

Other objects and advantages will appear in the following description and in the illustrative embodiment of the invention in the accompanying drawings, in which,—

Fig. 1 is a sectional elevation of a pumping apparatus embodying the invention;

Fig. 2 is a bottom plan view of the pump impeller;

Fig. 3 is a sectional elevation showing the automatic vent valve used to prevent the surging action described; and Fig. 4 is a sectional elevational view of a device used on the lower end of the suction pipe.

Referring to these drawings, the apparatus includes a casing 5, desirably although not necessarily of cylindrical form, which casing has a closed lower end and an opening 6 in its upper end. A member 7, suitably mounted on casing 5, closes the opening 6 with an air tight joint. A liquid supply conduit, consisting, as shown, of a pipe 8, communicating with a cored passage 9 formed in casing 5, communicates with the interior of the latter adjacent its upper end through an opening 10. The pipe 8 extends downwardly into the supply of liquid and, in accordance with usual practice, will have a non-return valve therein, although the provision of such a valve is not necessarily essential to the invention. It will thus be seen that the interior of casing 5 constitutes an air-tight compartment 11, and this compartment is originally filled with liquid, as indicated, up to the level of opening 10.

Fixed to member 7, and extending downwardly into and toward the bottom wall of casing 5, is a member 12 to the lower end of which is attached the casing 13 of the impeller pump. This casing, which is substantially circular, is centered in the lower end of casing 5 and restrained from lateral vibration therein, by a plurality of lugs 14 spaced angularly about one of the casings, as 5, and adapted to engage the other casing, as 6.

The pump casing 13 has an intake or inlet opening 15, which constantly communicates with the lower portion of casing 5, and at a substantial distance below opening 10. On the lower face of casing 13 and projecting downwardly toward and into close proximity with the bottom wall of casing 5, are a plurality of fins 16 which are angularly spaced about the casing 15 and radiate outwardly from the inlet opening 15. These fins are provided to prevent, as far as possible, the swirling and eddying of the liquid which would otherwise tend to occur about the pump inlet.

Mounted in casing 13, which as shown, is constructed in two parts to permit assembly, is an impeller which may be of any suitable type. As illustrated, the impeller is of the open type, having a single plate 17 with a series of vanes 18 depending therefrom into close proximity with the lower inner wall of casing 13. The pump illustrated is a centrifugal pump but other types of impeller pumps may be used if desired. The delivery opening of the pump casing 13 is indicated at 19 and this opening is connected by a plurality of cored passages 20 to the space in which the impeller rotates, communicating with such space near the outer peripheral portions thereof.

For economy of material the pump supporting member 12 is preferably made hollow as shown, and its interior constitutes a delivery conduit 21, which communicates with opening 19 and opens into a chamber 22 formed in member 7. From the chamber 22, a delivery pipe 23 extends to any desired point. It is not, however, necessarily essential that the delivery conduit 21 and supporting member 12 be combined, as shown, although this is desirable for the reason above stated.

The impeller plate 17 is fixed at one end to a shaft 24 which extends upwardly through members 12 and chamber 22 and has a bearing 25 in the upper wall of member 7 and a lower bearing 40 in part 13. Suitable packing, preferably of a type which requires little or no attention, is provided to restrain leakage of liquid from chamber 7 around shaft 24. As illustrated, a packing 26, known in the trade as "Labyrinth" packing may advantageously be employed. Supported from member 7, through the intermediary of a member 27, is an electric motor, conventionally indicated at 28, to the armature of which shaft 24 is connected. Such liquid, as may possibly escape from chamber 7 will pass into a chamber 29, formed between the members 7 and 27, and may be conveyed back to the supply, or to any other point, through a pipe 30. As shown, the latter leads to a passage 31 in casing 5, which communicates with an annular space 32 formed between the pipe 8 and a pipe 33 secured to the exteriorly threaded bub 34 of casing 5. This pipe 33 may extend to the main storage receptacle (not shown) or to any other desired point.

A pipe 35 is provided which extends from the "air space" of chamber 11 above the level of opening 10, downwardly with its lower end directed upwardly into the inlet opening of the intake 15 of the pump.

Means are also provided for automatically connecting the delivery conduit 21 to chamber 11, preferably at a level at or about that of opening 6. Such means includes a casing 36, best shown in Fig. 3, which affords a connecting passage 37. Fixed to casing 36 is a depending rod 38 upon which is slidably mounted a valve 39. The latter is normally held by gravity in the illustrated position to permit communication between the conduit 21 and chamber 11, but is movable upwardly, once the pump is set in operation, by the force of the ejected liquid, to close off such communication.

Preferably, means are provided for closing off communication between the suction pipe and the supply tank, when the level in the latter reaches a predetermined level. The lower end of suction pipe 8 is shown in Fig. 4 and, as there shown, a float 41 is slidably mounted upon it, being limited in its downward movement by a member 42 fixed, as by the screw thread connection shown, to pipe 8. Fixed to and depending from float 41 are a plurality of vertical arms 43 and pivotally mounted on member 42 intermediate their ends are a plurality of levers 44, the outer ends of which lie in the path of arms 43. The inner ends of levers 44 are adapted to engage and lift a disc 45 fixed to the lower end of a spindle 46 which carries on its upper end a valve 47, adapted to engage the valve seat 48 on member 42. As the level of liquid in the supply tank falls and approaches the lower end of pipe 8, so that there is liability of exhaustion of the supply, float 41 lowers and its arms 43 engage and move levers 44, lifting disc 45 and with it valve 47. The latter is eventually carried against seat 48, and, in such position, cuts off the flow of liquid from the supply tank to the pump, until such supply is replenished.

Assuming that chamber 11 is filled with liquid to the level indicated and that the pump impeller has been set in rotation by energization of motor 28, the liquid in chamber 11, serving to prime the pump, is expelled up the delivery conduit 21 in the usual and known manner. Simultaneously air is drawn in with the liquid by the pipe 35, and by the suction thus created plus that created by the removal of the liquid from chamber 11, liquid is lifted through the lift pipe 8 and passage 9 into the chamber 11 and continues to flow into the latter until the pump is stopped. On cessation of pumping, the liquid tends to return, and, in the absence of the usual non-return valve, will return, as far as permitted, to the source of supply. Even with the non-return valve, slow leakage may take place so that such a valve cannot be relied on to keep the pump primed. The stop valve, shown in Figure 4 and located in or at the lower end of the suction pipe 8, is employed to prevent the entire removal of the liquid from the main storage chamber. Upon cessation of the operation of the pump the liquid remaining in the system above the pump will surge back into chamber 11 and pipe 21. This liquid after filling chamber 11 will tend to overflow through opening 10 and by siphonic action cause the liquid to draw out of pipe 21 removing a portion of the priming liquid. To prevent this action, the valve 39, shown in Fig. 3, is provided which opens during the return flow of the liquid thereby allowing air to enter upper part of chamber 11, and insures the retaining of the priming liquid in chamber 11 and pipe 21.

The invention has been disclosed herein, in an embodiment at present preferred, for illustrative purposes but the scope of the invention is defined by the appended claims rather than by the foregoing description.

What we claim is,—

1. Pumping apparatus, comprising, a pump of the impeller type, a casing affording an air-tight chamber in the lower end of which said pump is located with its intake in constant communication therewith, a lift pipe for liquid communicating with said chamber above the level of the intake of said pump, and a delivery pipe extending from the pump outwardly through said casing.

2. Pumping apparatus, comprising, a pump of the impeller type, a casing affording an air-tight chamber in the lower end of which said pump is located with its intake in constant communication therewith, a lift pipe for liquid communicating with said chamber above the level of the intake of said pump, a delivery pipe extending from the pump outwardly through said casing means for rotating the impeller of said pump, and means for automatically placing the delivery pipe and chamber in communication when said impeller comes to rest.

3. Pumping apparatus, comprising, in combination with a pump of the impeller type, a casing affording an air-tight chamber in the lower portion of which said pump is located with its intake in constant communication therewith, a liquid supply conduit extending from below the level of said intake and communicating with said chamber above the level thereof, a delivery pipe extending from the pump outwardly through said casing means connecting the delivery pipe to the chamber adjacent the upper end thereof, and a valve controlling said connecting means and operable when pumping ceases to open the latter.

4. Pumping apparatus, comprising, a pump of the impeller type, a casing affording an air-tight chamber in the lower end of which said pump is located with its intake in constant communication therewith, a lift pipe for liquid communicating with said chamber a substantial distance above the level of the intake of said pump, and a conduit communicating at one end with the intake of said pump and at the other end with said chamber above the level of said pipe.

5. Pumping apparatus, comprising, an air-tight casing, a pump casing mounted therein and having an inlet opening communicating with the air-tight casing, a plurality of fins on the pump casing radiating from the inlet opening and projecting downwardly toward the bottom of the air tight casing, a rotary impeller in the pump casing, and a lift pipe for liquid delivering into the air tight casing above the level of said inlet opening.

6. Pumping apparatus, comprising, an air-tight casing, a pump casing located therein adjacent the lower end thereof and having an inlet opening in constant communication therewith, a member connecting the pump casing to the top of the other casing, whereby the former is suspended within the latter, and a plurality of projections spaced about the side walls of one of said casings to engage other casing and thereby restrain the pump casing from lateral movement.

7. Pumping apparatus, comprising, an air-tight casing, a pump casing located therein adjacent the lower end thereof and having an inlet opening in constant communication therewith, a delivery pipe extending from the pump casing upwardly through the first casing, an impeller in the pump casing, and a drive shaft for the impeller extending upwardly through the delivery pipe.

In testimony whereof we have affixed our signatures.

FRANCIS H. GRIFFITHS.
HARRY F. BENSON.